United States Patent [19]

Spencer et al.

[11] Patent Number: 4,892,324

[45] Date of Patent: Jan. 9, 1990

[54] FIFTH WHEEL MOUNTING PAD

[75] Inventors: Charles P. Spencer, Staunton, Ill.; Terry L. Pitchford, St. Louis, Mo.; Robert P. Radwill, Burr Ridge, Ill.

[73] Assignee: Amsted Industries Incorporated, Chicago, Ill.

[21] Appl. No.: 234,517

[22] Filed: Aug. 22, 1988

[51] Int. Cl.$^4$ .............................................. B62D 53/08
[52] U.S. Cl. ..................................... 280/440; 267/292
[58] Field of Search ....................... 403/225, 226, 228; 280/439, 440; 267/153, 292

[56] References Cited

U.S. PATENT DOCUMENTS

| | | | |
|---|---|---|---|
| 2,784,009 | 3/1957 | Braunberger | 280/440 |
| 2,815,944 | 12/1957 | Rothweiler | 403/228 X |
| 2,856,203 | 10/1958 | Kayler | 280/440 |

Primary Examiner—David M. Mitchell
Assistant Examiner—Michael Mar
Attorney, Agent, or Firm—Charles E. Bouton; Edward J. Brosius

[57] ABSTRACT

An improved fifth wheel structure for over the road tractors wherein a resilient elastomer pad placed between a fifth wheel pocket surface and a bearing surface includes non-extrudable end members to prevent extrusion of the pad from the pocket and wherein the pocket surface and corresponding shoe surface may also be undulated to better retain the elastomer pad.

12 Claims, 3 Drawing Sheets

FIG-8-
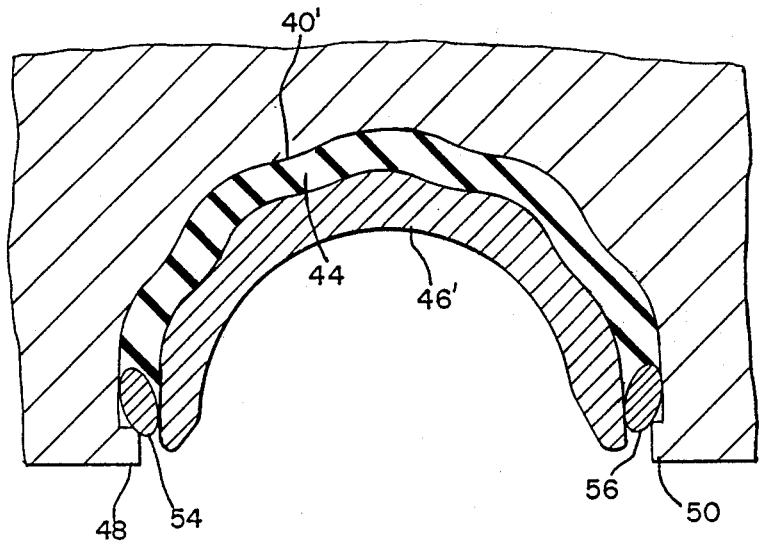
FIG-9-
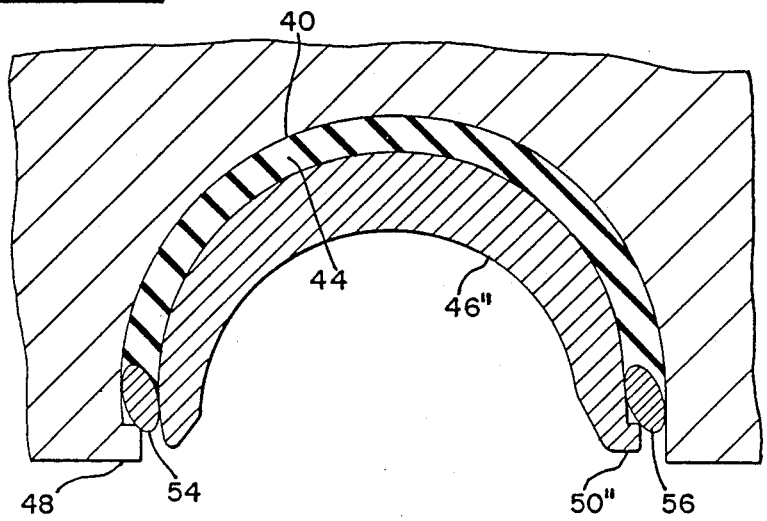

FIFTH WHEEL MOUNTING PAD

FIELD OF INVENTION

The present invention relates to fifth wheels for over the road tractors by which trailers are demountably connected to the tractors, and more particularly to an improved resilient pad placed between the fifth wheel structure and each mounting bracket on the tractor frame.

BACKGROUND OF THE INVENTION

Fifth wheel devices include a plate which supports upon its upper surface the forward plate bed of a trailer. The underside of the fifth wheel rests on two mounting brackets which are secured to each side of the tractor frame. Pockets are formed at each edge of the fifth wheel underside to receive and rest upon arcuate upper portions of the mounting brackets so as to spread the forward weight of the trailer over a substantial interface area; and horizontal pins extend through the brackets and fifth wheel edges to prevent vertical separation. Normally the interface has been cushioned by an elastomer pad at each interface between mounting bracket and fifth wheel pocket. However, it has been found that during use the loads placed upon the fifth wheel have caused the elastomer pad to be compressed to the point that it extrudes from between the brackets and fifth wheel pockets thereby resulting in losing the pad and its cushioning effect, or a permanent reduction in cross section and consequent introduction of play between the brackets and fifth wheel. This has occurred despite the introduction of ledges on the ends of the pocket interface intended to reduce the area through which the pad may extrude.

SUMMARY OF THE INVENTION

Accordingly it is an object of the invention to provide any improved elastomer pad that will not be reduced by extrusion from the interface of load supporting surfaces.

It is another object of the present invention to provide an improved non-extrudable elastomer pad for placement between a fifth wheel pocket and mounting bracket.

It is a further object of the present invention to provide a fifth wheel pocket and improved elastomer pad to fit within the pocket that will resist extrusion of the pad when the fifth wheel is loaded.

It is still another object of the present invention to provide a fifth wheel pocket and shoe with undulated surfaces to better retain an elastomer pad against extrusion of the pad when the fifth wheel is loaded.

Basically the present invention is the provision of nonextrudable portions at the ends of an elastomer pad to block extrusion of the elastomer material from the interface of a fifth-wheel and its mounting bracket.

BRIEF DESCRIPTION OF THE DRAWINGS

Further objects and advantages will become apparent upon reading the following detailed description in conjunction with the drawings wherein:

FIG. 8 is a detailed sectional side elevation of a modified embodiment of the present invention wherein the fifth wheel pocket surface and corresponding shoe surface are undulated to better retain any elastomer pad; and FIG. 9 is a side elevation view of a further embodiment of the invention wherein the shoe is modified.

DETAILED DESCRIPTION OF THE INVENTION

Figure 1:
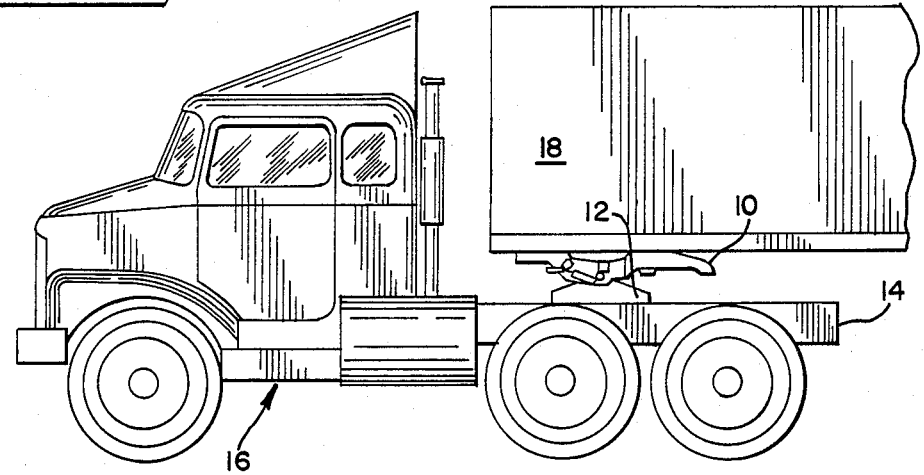
FIG. 1 is a side elevation view of a tractor and trailer showing a fifth wheel and one mounting bracket.
Figure 2:
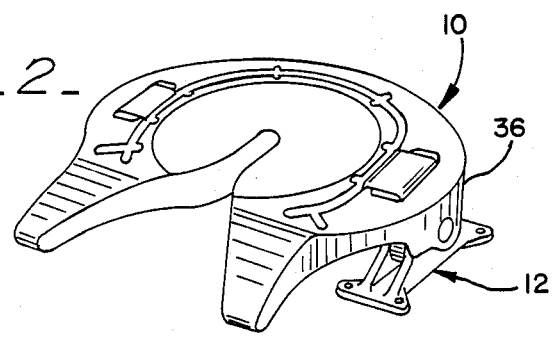
FIG. 2 is a perspective view of a fifth wheel and one mounting bracket.
Figure 3:
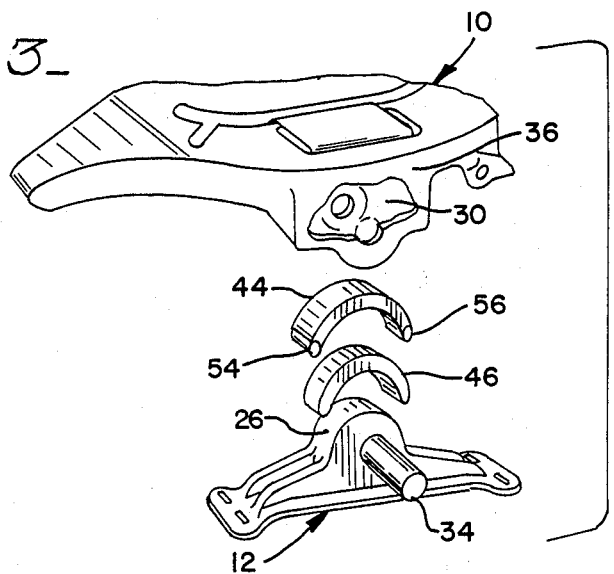
FIG. 3 is an exploded view of a fifth wheel (partial) and mounting bracket with a pad constructed according to the present invention.

Referring to FIGS. 1-3 a fifth wheel generally 10 is pivotally supported on two mounting brackets generally 12 (only one being visible in the drawings) which are fastened to the frame 14 of a tractor generally 16 and the forward end of a trailer generally 18 rests upon the upper surface 20 of the fifth wheel 10. Each bracket 12 includes an arcuate bearing surface 26 which is received in a pocket 30 formed at the underside of each opposite edge of the fifth wheel 10. In operation the fifth wheel 10 is pivotable on the bracket bearing surfaces 12 and is retained against vertical displacement by pins 34 which extend through each bracket 12 and the skirt 36 of the fifth wheel.

Figure 4:
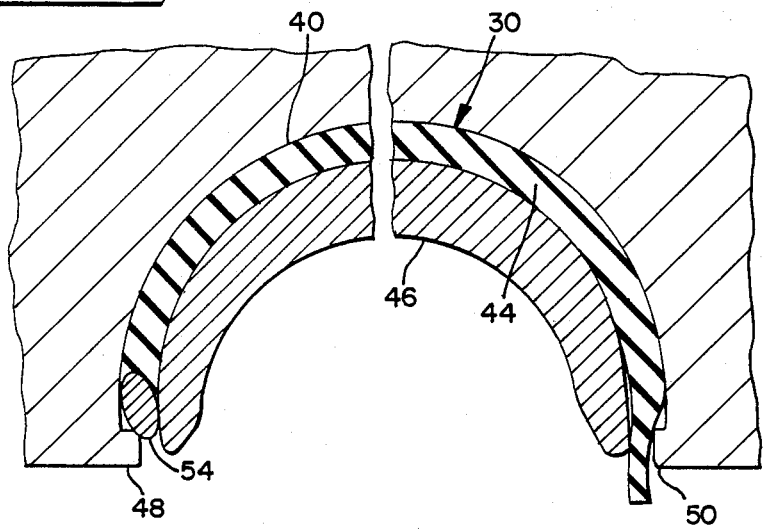
FIG. 4 is a detailed sectional side elevation of a fifth wheel pocket with pad divided to show both prior art (right side) and one embodiment of the present invention (left side)

As may be seen in FIGS. 3 and 4 the pocket 30 is a hollow receptacle having an arcuate upper surface 40 which generally conforms to the shape and size of the bracket bearing surface 26 and additionally receives an elastomer pad generally 44 and a rigid shoe 46 between pocket surface 40 and bracket bearing surface 26. When the fifth wheel is loaded the pad 44 will be compressed and the vertical distance separating pocket arcuate surface 40 and shoe 46 (and bracket surface 26) will be reduced. However, the shoe 46 and arcuate surface 40 are normally sufficiently curved that the ends thereof tend to relatively slip without substantially reducing the horizontal space therebetween.

Transverse ledges 48, 50 project inwardly from each end of the pocket arcuate surface 40 toward the ends of the shoe 46 (and toward the bearing surface 26) but the ledges 48, 50 may not extend into contact therewith as binding of the parts would thereby occur upon a load being applied to the fifth wheel 10. Thus a substantial clearance must remain between the ledges 48, 50 and shoe 46 thereby leaving openings through which the elastomer pads 44 have heretofore extruded (as illustrated in the right hand portion of FIG. 4). It will be apparent that the same function may be obtained if the ledges are formed on the shoe 46.

The present invention prevents such extrusion by utilizing non extrudable end members generally 54, 56 at opposite ends of the elastomer pad 44. As may be seen in the left hand portion of FIG. 4 the non-extrudable end member 54 rests against ledge 48 on the pocket surface 40 and effectively blocks the opening left between ledge 48 and shoe 46. Each end member 54 is sufficiently thick to only block the clearance between a ledge 48 or 50 and the shoe 46 and need not fill the horizontal space between the pocket surface 40 adjacent the ledges and the free ends of shoe 46. Indeed it is preferred that the end members 54 leave some play at that space so as to allow some cushioning effect adjacent the ledges. The fact that end member 54 is non-extrudable does not lessen the cushioning effect of the elastomer pad 44 because at the location of ledge 48, 50 the major relative motion between shoe 46 and pocket surface 40 is parallel-sliding without significant compression, and the end member 54 merely slides across the end of the shoe 46.

Figure 5:
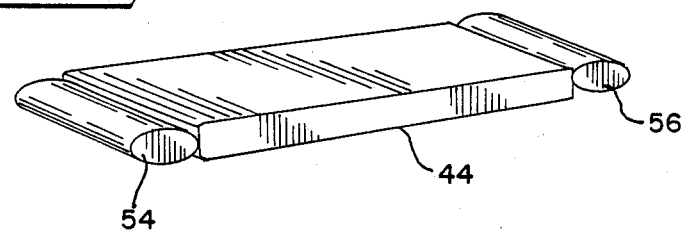
FIG. 5 is a perspective view of an embodiment of an elastomer pad of the present invention.
Figure 6:
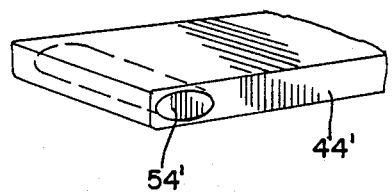
FIG. 6 is a partial perspective view of another embodiment of an elastomer pad of the present invention.
Figure 7:
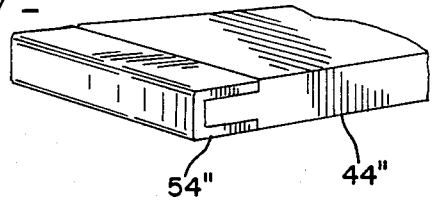
FIG. 7 is a partial perspective view of a further embodiment of an elastomer pad of the present invention.

The non-extrudable end members 54, 56 may take various forms such as illustrated in FIGS. 5–7. As shown in FIGURE 5 (and in FIG. 4) the end members may be in the form of short bars freely associated with the ends of pad 44 or secured thereto by adhesive or the like. In FIG. 6 an end member 54' is shown comprising a short bar imbedded in the elastomer pad 44'; and in FIG. 7 the end member 54" is in the form of a "U" clip compressed upon the end of an elastomer pad 44" or otherwise engaged on a formed pad end. A variety of materials may be useful for whatever form of non-extrudable end member that may be chosen such as rigid plastic wood and metal, the latter being preferred.

In a preferred embodiment of the invention shown in FIG. 8, the pocket surface 40' and corresponding surface of shoe 46' are modified to include undulations transverse to the curvature of shoe 46 which serve to hinder relative movement or slippage between the pad 44 and pocket surface 40' and to provide an increased interface for the elastomer as the pad is initially compressed yet blocked from extrusion by end members 54 and 56. It is also possible to corrugate only one of the aforementioned surfaces to obtain advantages of the present invention.

It is also possible to relocate at least one of the ledges 48, 50 from the pocket 30 to the shoe 46. As shown in FIG. 9 a ledge 50" is formed at the outside of one end of shoe 46". However, to facilitate assembly of pad 44 and such modified shoe 46" into a pocket 30, so as to permit a sliding movement between the shoe 46" and pad 44, it may be advantageous to provide one ledge 48 at one end of the pocket surface 40 and the opposite ledge 50" on only one end of shoe 46".

The foregoing details have been provided to describe the best mode of the invention and still further variations and modifications may be made without departing from the spirit and scope of the invention which is defined in the following claims.

What is claimed is:

1. An improved fifth wheel mounting wherein mounting brackets attached to a tractor frame have arcuate bearing surfaces that are received within pockets on the underside of the fifth wheel toward arcuate pocket surfaces therein with an arcuate shoe placed between said surfaces, said improvement comprising:
   an inwardly directed ledge at each end of one of said arcuate pocket surface and said arcuate shoe, said ledge reducing but not closing an open space between said arcuate pocket surface and said shoe;
   a resilient elastomer pad interposed between said arcuate pocket surface and said shoe said pad having an end proximate each said inwardly directly ledge;
   and a non-extrudable end member located at each end of said pad and between said arcuate bearing surface and said arcuate shoe and inwardly of each ledge, said end member extending substantially the width of said elastomer pad whereby to completely block extrusion of said pad from the inside between said arcuate pocket surface and shoe when a load is placed on said fifth wheel causing said pad to be compressed while still allowing for relative movement between said arcuate pocket surface and said shoe to provide a cushioning effect.

2. The improved fifth wheel mounting of claim 1 wherein said arcuate pocket surfaces and shoe are sufficiently curved in cross section that the ends thereof slip with respect to one another and do not substantially close upon said pad being compressed.

3. The improved wheel mounting of claim 1 wherein the said ledges are formed on said arcuate pocket surface whereby said open space between said arcuate pocket surface and said shoe increases when a load is placed on said fifth wheel.

4. The improved fifth wheel mounting of claim 1 wherein said non-extrudable end member is a bar butted against an end of said pad.

5. The improved fifth wheel mounting of claim 1 wherein said non-extrudable end member is a bar imbedded in the end of said pad.

6. The improved fifth wheel mounting of claim 1 wherein said non-extrudable end member is a clip secured to the end of said pad.

7. In a movable connection between an arcuate bracket bearing surface and a load bearing pocket arcuate surface wherein an elastomer pad is interposed between the pocket surface and the bracket bearing surface, the improvement comprising:
   an arcuate shoe positioned between said bracket bearing surface and said pocket arcuate surface;
   an inwardly directed ledge at each end of one of said arcuate pocket surface and said arcuate shoe, said ledge reducing but not closing an open space between said arcuate pocket surface and said shoe;
   a resilient elastomer pad interposed between said arcuate pocket surface and said shoe, said pad having an end proximate each said inwardly directed ledge;
   and a non-extrudable end member located at each end of said pad and between said arcuate pocket surface and said arcuate shoe and inwardly of each ledge, said end member extending substantially the width of said elastomer pad whereby to completely block extrusion of said pad from the inside between said arcuate pocket surface and shoe when a load is placed on said movable connection causing said pad to be compressed while still allowing for relative movement between said arcuate pocket surface and said shoe to provide a cushioning effect.

8. The invention of claim 7 wherein said non-extrudable end member is a bar butted against an end of said pad.

9. The invention of claim 7 wherein said non-extrudable end member is a bar imbedded in the end of said pad.

10. The invention of claim 7 wherein the non-extrudable end member is a clip secured to the end of said pad.

11. The invention of claim 7 wherein the ledges are formed on the ends of said pocket arcuate surface whereby said opening between said surfaces increases when a load is placed on said fifth wheel.

12. The invention of claim 7 wherein one ledge is formed on an end of said pocket arcuate surface and another ledge is formed on an end of said shoe.

* * * * *